Dec. 27, 1960  H. C. MORROW  2,966,120
PRESSURE REGULATOR
Filed Feb. 6, 1958  2 Sheets-Sheet 1

INVENTOR
H. C. Morrow
BY Ahley & Ahley
ATTORNEYS

INVENTOR
H. C. Morrow

ATTORNEYS

United States Patent Office 2,966,120
Patented Dec. 27, 1960

2,966,120

PRESSURE REGULATOR

H. C. Morrow, Wellington, Tex., assignor, by direct and mesne assignments, to Morrow Industries, Inc., Wellington, Tex., a corporation of Texas Filed Feb. 6, 1958, Ser. No. 713,682

4 Claims. (Cl. 103—17)

This invention relates to new and useful improvements in pressure regulators and more particularly to pressure regulators for fluid distribution systems.

One object of the invention is to provide an improved pressure regulator for a fluid distribution system, such as a portable water irrigation system, which is adapted to maintain a substantially uniform pressure in the system by controlling the speed of the supply pump in accordance with the pressure of the fluid in the system.

A particular object of the invention is to provide an improved pressure regulator, of the character described, which is of such arrangement that a predetermined pressure can be maintained in a fluid distribution system substantially irrespective of the volume of fluid being distributed.

An important object of the invention is to provide an improved pressure regulator, of the character described, which includes means responsive to the pressure of the fluid in the distribution system for controlling the acceleration of an engine which drives the supply pump whereby the pressure of the fluid delivered by said pump remains substantially uniform regardless of increases or decreases in the size of the system.

Another object of the invention is to provide an improved pressure regulator, of the character described, which includes a pair of pressure-responsive members connected in the fluid distribution system and a valve for controlling communication between the system and one of the members which has connection with the carburetor of the engine, the second member being arranged to open the valve upon variations in the pressure of the fluid so as to expose the first member to such variations for controlling the acceleration of the engine and thereby maintain a substantially uniform pressure in the system.

A construction designed to carry out the invention will be hereinafter described, together with other features of the invention.

Figure 1:
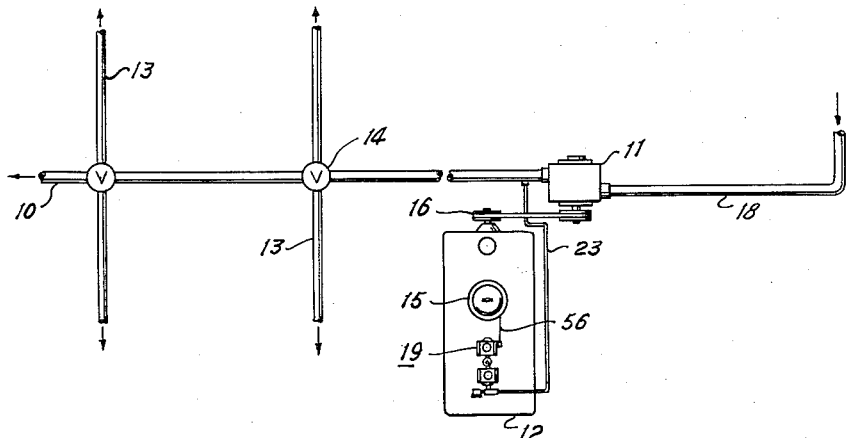
Figure 2:
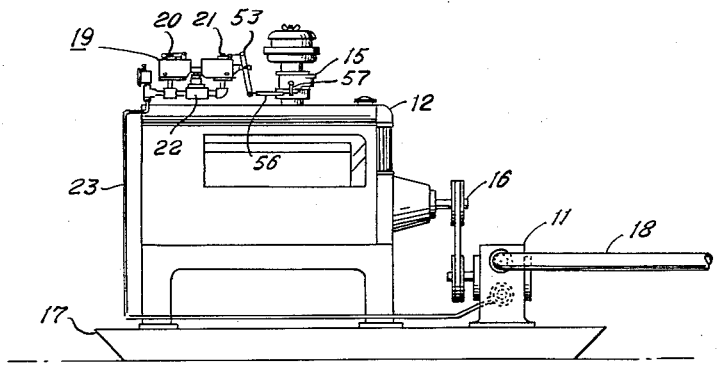
Figure 5:
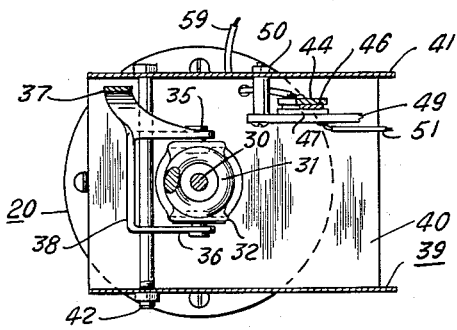
Figure 3:
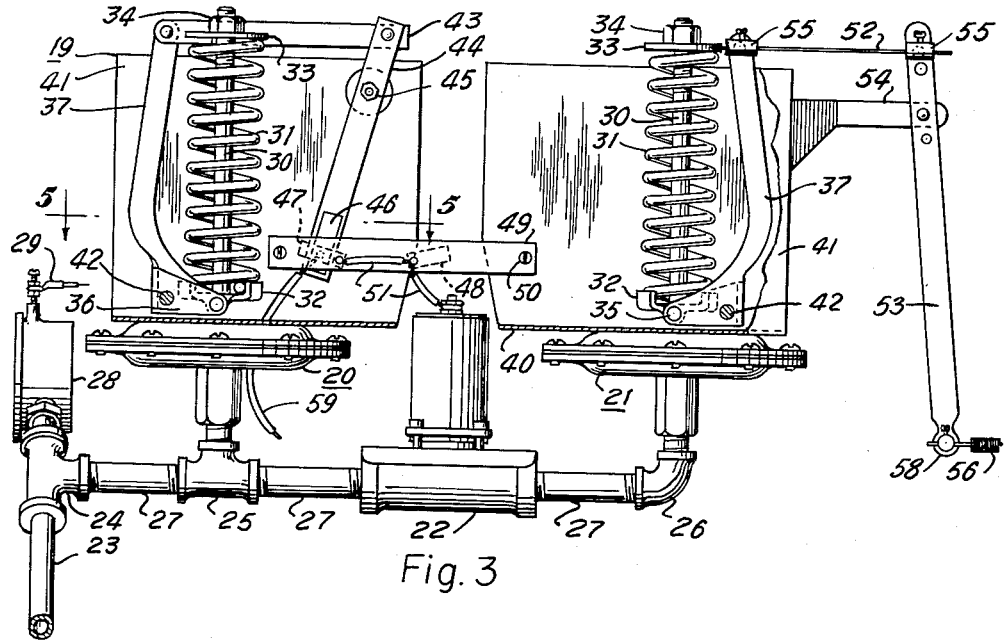
Figure 4:
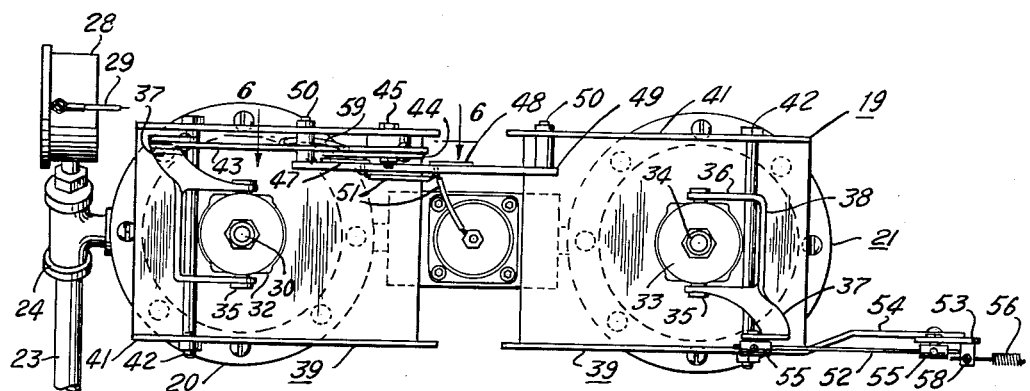
Figure 6:
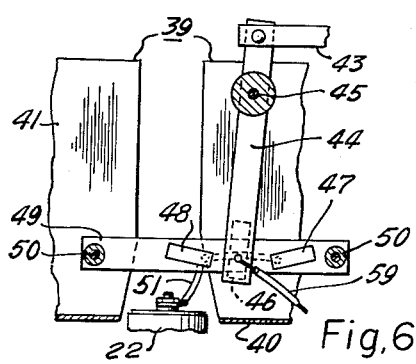

The invention will be more readily understood from a reading of the following specification and by reference to the accompanying drawings, wherein an example of the invention is shown, and wherein:

Fig. 1 is a plan view of a portion of a portable water irrigation system having a pressure regulator constructed in accordance with the invention, Fig. 2 is a side elevational view showing the relationship of the pressure regulator to the engine and pump of the system, Fig. 3 is an enlarged, side elevational view of the regulator, Fig. 4 is a plan view of the regulator, Fig. 5 is a horizontal, cross-sectional view, taken on the line 5—5 of Fig. 3, and Fig. 6 is a vertical, sectional view, taken on the line 6—6 of Fig. 4, showing the valve actuator in its inoperative position.

In the drawings, the numeral 10 designates the main conductor or supply pipe of a water irrigation system which is shown as being of the portable type and which includes a pump 11 connected in the conductor and an engine 12 for driving the pump. A plurality of laterals 13, usually of less diameter, extend from the main conductor and are connected thereto by suitable valves 14. In order to facilitate movement of the system from one location to another as well as its re-arrangement, the main conductor and laterals are formed in sections which have slip-joint connections (not shown). Although these connections are capable of handling ordinary pressures, such as fifty pounds per square inch, the same fail and break loose when the pressure becomes excessive due to shutting off of one or more of the valves 14 and/or disconnection of one or more of the laterals 13. Also, there is insufficient pressure when additional laterals are added or connected in the system. Heretofore, it has been necessary for the operator to decelerate or acccelerate the engine in order to decrease or increase the volume and resulting pressure of the water delivered by the pump. It is noted that the engine 12 includes a carburetor 15 and is drivingly connected to the pump 11 by a conventional belt and pulley arrangement 16. If desired, the pump and engine may be mounted on a common skid 17 as shown in Fig. 2. A suitable conductor or pipe 18 supplies water to the pump from a source (not shown).

For maintaining a predetermined pressure in the main conductor 10 and laterals 13 of the distribution system, a pressure regulator 19 is provided and includes a pair of pressure-responsive members or spring-pressed diaphragms 20 and 21 and a solenoid valve 22 which co-act to accelerate and decelerate the engine 12 in accordance with such pressure. The valve and pressure-responsive members are connected in a small conductor or pipe 23 which communicates with the main conductor at the discharge side of the pump 11. The pressure regulator 19 is positioned adjacent the carburetor 15 (Figs. 1 and 2) and has its pressure-responsive members 20 and 21 connected to the small pipe 23 by T's 24 and 25, an elbow 26 and nipples 27 (Fig. 3). The solenoid valve 22 is interposed between the pressure-responsive members and is connected to the T 25 and elbow 26 by two of the nipples 27. If desired, a pressure gauge 28 may be connected to the T 24 and may have an electrical connection 29 with the engine ignition (not shown) for stopping operation of the engine when the pressure of the water drops below a safe minimum.

The pressure-responsive members are substantially identical and each includes an upstanding rod or plunger 30 having a helical spring 31 confined thereon between an underlying cradle or retainer 32 and an overlying washer 33. A nut 34 is screw-threaded on the upper end of each rod 30 above the washer 33 for adjusting the compression of the spring 31. Each cradle 32 is connected to its rod and has a pair of transverse pintles or trunnions 35 projecting laterally for pivotal connection with the lower arms 36 of an angular lever or bell crank 37, the arms being connected by a web portion 38. For supporting each bell crank 37, a U-shaped bracket 39 has its base portion 40 underlying the cradle 32 and arms 36 with the rod 30 extending therethrough. The brackets 39 are disposed in alined, spaced relationship and have pairs of upright, widely-spaced walls 41 and a suitable pin or bolt 42 extends between the lower portions of each pair of walls for pivotally supporting each bell crank.

A transverse link 43 pivotally connects the upper end of the bell crank 37 of the pressure-responsive member 20 to the upper end of an upright lever 44 which is pivotally mounted on one of the bracket walls 41 as shown at 45 (Figs. 3 and 4). The lower end of the lever 44 carries an electrical contact element 46 for engagement with a pair of spaced electrical contacts 47 and 48 mounted on a horizontal bar 49 of dielectric material (Fig. 6). The bar 49 extends between and in parallel relation to the upright walls 41 of the brackets and has its ends connected thereto in spaced relationship as shown at 50. Suitable lead wires 51 connect the contacts 47 and 48 to each other and to the solenoid valve 22, while the element 46 is connected to a source of electrical energy (not shown) by a lead wire 59.

The bell crank 37 of the pressure-responsive member 21 has its upper end connected by a rod or stiff wire 52 to the upper end of an upright lever 53 which is pivotally supported by an extension 54 of one of the bracket walls 41. Preferably, the rod 52 is adjustably connected to the bell crank and lever by suitable clamps 55 whereby the effective length of said rod may be varied. A flexible cable 56 extends from the actuating arm 57 of the carburetor 15 and is adjustably connected to the lower end of the lever 53 by a suitable clamp 58. Due to this arrangement, the lever is swung clockwise by clockwise pivoting of the bell crank so as to pull the cable 56 toward the left for decelerating the engine 12 and reducing the volume of water delivered by the pump 11. The engine is accelerated and an increased volume of water is delivered by the pump when the bell crank and lever are pivoted in the opposite direction and the cable pushed toward the right. Of course, the bell crank is pivoted clockwise by upward movement of the rod and counter-clockwise by downward movement of said rod, such movement being caused by the pressure of the water exerted upon the pressure-responsive member 21 and the force of its spring 31.

Since the bell crank of the pressure-responsive member 20 is mounted at its left, said crank is pivoted counter-clockwise by upward movement of the rod and clockwise by downward movement of said rod. The lever 44 is swung in the same direction so that its element 46 engages the contact 48 upon upward movement of the rod and the contact 47 upon downward movement of said rod (Figs. 3–5).

In operation, the compression of the springs 31 is adjusted so that the speed of the engine causes the pump to deliver water at a predetermined pressure to the irrigation system. When so adjusted, the element 46 of the lever 44 is disposed between the contacts 47 and 48 so as to break the circuit to the solenoid valve 22 (Fig. 6). Since it is self-closing, the valve shuts off communication between the system and the pressure-responsive member 21; however, water is trapped between said valve and member for holding said member against actuation. The pressure-responsive member 20 is constantly exposed to the pressure of the water and is actuated whenever said pressure drops below or rises above a predetermined amount. The pressure in the system decreases when additional laterals 13 are added and increases whenever one or more of the laterals are operatively disconnected from the system. The pressure regulator of the present invention compensates for this variation in pressure by reducing or increasing the volume of water delivered by the pump.

When the pressure drops to a predetermined point, the force of the spring 31 of the pressure-responsive member 20 forces the rod 30 downwardly so as to pivot the bell crank 37 and lever 44 clockwise and move the element 46 into engagement with the contact 47. This actuates and opens the valve 22 to reduce the pressure exerted upon the pressure-responsive member 21 whereby its spring forces its rod downwardly. This movement pivots the bell crank 37 and lever 53 counter-clockwise and pushes the cable 56 toward the right so as to accelerate the engine and increase the volume of water delivered by the pump, thereby increasing the pressure to the desired amount.

When the pressure in the system exceeds the predetermined amount, it will actuate the pressure-responsive member 20 to raise its rod 30 and pivot its bell crank and lever 44 in a counter-clockwise direction. The element 46 is moved into engagement with the contact 48 to actuate and open the valve for exposing the pressure-responsive member 21 to the increased pressure. The rod of the latter member is raised by the increased pressure and the bell crank and lever 53 are swung clockwise to pull the cable 56 toward the left for decelerating the engine. As a result, the volume of water delivered by the pump is decreased until the pressure is reduced to the predetermined amount.

Whenever the predetermined pressure is reached, either upon a decrease or increase of pressure, the pressure-responsive member 20 functions to move the element 46 out of engagement with the contact 47 or 48 whereby a substantially uniform pressure is maintained. Although the pressure regulator is designed for use with water irrigation systems, it is pointed out that the pressure of other fluid distribution systems may be controlled by said regulator.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a fluid distribution system having a pump for supplying fluid under pressure to the system and an engine for driving the pump and a carburetor for controlling the speed of the engine, a pressure regulator including a pair of pressure-responsive members communicating with the system and adjusted so as to be inoperative at a predetermined pressure, each member including a reciprocable rod movable by the pressure of the fluid in the system, a spring for resisting movement of each rod, a pivotally mounted lever connected to each rod for movement thereby, the lever of the first of the members having connection with the carburetor for accelerating and decelerating the engine, a valve interposed between the system and first member for controlling communication between the system and first member, the second member being constantly exposed to the pressure of the fluid, and means having connection with the lever of said second member and the valve for movement by the lever of said second member to open the valve when the pressure of the fluid drops below or exceeds the predetermined pressure so as to expose said first member to the decreased or increased pressure whereby the engine is accelerated by the decreased pressure and decelerated by the increased pressure.

2. A pressure regulator as set forth in claim 1 wherein the valve is of the self-closing solenoid type, an electrical circuit connected to the solenoid of said valve, and a pair of spaced contacts in the circuit, the valve opening means being disposed between the contacts for movement into engagement with one of said contacts at a time to close the circuit and open said valve.

3. A pressure regulator as set forth in claim 1 wherein the valve opening means includes a pivoted lever connected to the lever of the second pressure-responsive member.

4. A pressure regulator as set forth in claim 3 including an electrical circuit having a pair of spaced contacts, the valve being of the self-closing type, a solenoid connected in the circuit for opening said valve, and an element carried by the valve opening lever for engagement with one of the contacts at a time to close the circuit and open said valve.

References Cited in the file of this patent

UNITED STATES PATENTS

| | | |
|---|---|---|
| 1,501,412 | Ingram | July 15, 1924 |
| 2,009,659 | Hill et al. | July 30, 1935 |
| 2,463,364 | Dustin | Mar. 1, 1949 |
| 2,634,681 | Rowell | Apr. 14, 1953 |